United States Patent [19]
Peddinghaus

[11] 3,831,626
[45] Aug. 27, 1974

[54] PISTON FOR A SHOCK ABSORBER

[76] Inventor: Carl Ullrich Peddinghaus, Obere Lictenplatzer Str. 276, Wuppertal-Barmen, Germany

[22] Filed: Dec. 14, 1972

[21] Appl. No.: 315,244

[52] U.S. Cl.............. 137/493.8, 188/317, 188/282
[51] Int. Cl.............................................. F16k 17/18
[58] Field of Search.......... 137/493.8, 512, 512.15; 188/282, 317

[56] References Cited
UNITED STATES PATENTS
| | | | |
|---|---|---|---|
| 2,472,841 | 6/1949 | Ochs | 188/317 X |
| 2,811,226 | 10/1957 | Allinquant | 137/493.8 X |
| 2,897,923 | 8/1959 | Agar | 137/493.8 X |
| 3,088,556 | 5/1963 | De Carbon | 188/317 |
| 3,199,636 | 8/1965 | De Carbon | 188/317 |
| 3,256,960 | 6/1966 | Casimir | 188/317 X |

FOREIGN PATENTS OR APPLICATIONS
1,138,557  12/1955  France.......................... 137/493.8

Primary Examiner—Henry T. Klinksiek
Assistant Examiner—Robert J. Miller
Attorney, Agent, or Firm—Holman & Stern

[57] ABSTRACT

A shock absorber piston in which there is provided a piston body mounted on an end portion of a piston rod. The body has ports therein which open into respective grooves in respective opposed sides of the body. A valve plate is completely received in each groove to overlie the respective port and a support plate is at least partially received in each groove. Each support plate presses flat against a middle region of the respective valve plate but has end portions which allow a variable opening of end regions of the valve plate. The grooves are greater in length than the respective support plates but lesser in length than the diameter of the piston body.

10 Claims, 4 Drawing Figures

PATENTED AUG 27 1974 3,831,626

3,831,626

PISTON FOR A SHOCK ABSORBER

BACKGROUND OF THE INVENTION

The invention relates to a piston for a shock absorber which is secured on an end portion of a piston rod so that it is fixed against axial movement relative to the piston rod, with said end portion being of reduced diameter. The piston has diametrically opposed valve ports which are covered by means of rectangular spring plates which are located in grooves and which are provided with central openings fitted on the end portion of the piston rod, with opening movement of said spring plates being limited by end regions of thick, rigid support plates, said end regions being sloped away from the piston. The valve plates can be supported in a convenient manner with known pistons of this kind.

Compared with this, the object underlying the invention is to construct a piston for a shock absorber of the type specified in the introduction in such a way that, with a small amount of expense, it is possible to provide a way of influencing flow characteristics in a certain manner.

For instance, it is often desirable, in order to obtain a very gentle damping effect, for the damping force to increase proportionally first of all and then to diminish as the speed of the piston increases. For this, it must be possible to increase the flow cross-section, first of all proportionally, with an increasing angle of the valve plates, and then to increase it at a faster rate than the increasing opening angle. In other instances, in the interest of improved driving safety, a particularly strong damping effect is required above certain piston speeds. For this, it is necessary to allow the cross-section of the flow above a certain angle of opening of the valve plates to increase at a slower rate as the angle of opening increases. Finally, in special cases, shock absorbers are required which, after an initial proportionally increasing damping force, have first of all a diminishing damping power and then a more quickly increasing damping power. In this instance, the flow cross-section must, after an initial proportional period, first of all increase more than the angle of opening and then less than this angle. In all cases, it must be possible to exert an influence on the flow after it has already left the valve. At the same time, however, further structural aspsects must be taken into account, according to which the dimensions of the shock absorber and therefore also of the piston must undergo restrictions.

BRIEF SUMMARY OF THE INVENTION

According to the invention, the solution which is suggested for this object is that the support plates lie in a known manner with their central portions flat against the valve plates and have approximately the same width and at least the same length as these valve plates, and that the grooves are deep enough to receive the valve plates completely and to receive at least part of the thickness of the support plates, and that the length of the grooves is greater than that of the support plates and smaller than the diameter of the piston.

In this way, a shock absorber piston is obtained which extends less in an axial direction than the known embodiments. Furthermore, in the new shock absorber piston, a flow path which extends in a radial direction is formed for the flow of damping medium emitted out of the valves, with said flow path being limited by the axially extending walls of the groove and of the support plate. In the course of this flow path, there are numerous possibilities for altering the flow resistance as a function of the angle of opening of the spring plates in order to obtain any desired damping characteristic.

Conveniently, at least the narrow end walls of the grooves and/or of the support plates are constructed with a profile for altering the cross-section of the flow in the region of the variable angle of opening of the valve plates. In addition, the longitudional walls of the grooves and/or of the support plates can also be shaped in the same way at least as far as the middle zone of the support plates. The construction of the end walls of the groove, at an angle inclined in the direction of the edge of the valve plate, leads to the flow cross-section decreasing as the angle of opening of the valve plates increases, whereas if this is inclined in the opposite direction, the opposite effect is produced. Such inclinations or curves can be formed in the walls of the groove during manufacture without this incurring any more expense, particularly with a metal powder finish.

In order not to produce an undesirable flow, constriction along the flow route described, an edge zone of each support plate opposite the end wall and facing towards the piston, is preferably profiled in the manner of a nozzle, with the support plates around this edge zone being longer than the valve plates. The effect achieved through this measure is, in the first place, surprising because, with a support plate which is longer than the valve plate, the cross-section of the flow route is geometrically reduced. However with the support plate increased in the manner proposed, in spite of the reduction in the geometrical cross-section, the cross-section of the flow becomes greater, with the reason for this being that a sharp-edged construction of the edge of the support plate results in a flow constriction to about two-thirds of the geometrical cross-section, whereas the nozzle-shaped construction only results in a constriction of the geometrical cross-section to about 95 percent. Considerable advantages are therefore obtained if the edge zones of the support plates extend for up to about a quarter of the distance between the ends of the respective valve plates and adjacent end walls of the grooves.

In a particularly advantageous manner, use is made in the shock absorber piston described in the invention of a measure made known in the French PS No. 1 228 982, where two opposite pairs of valve ports, displaced about 90°, are covered on both front sides of the piston with the valve and support plate. This arrangement causes the reduction in the cross-section of the actual piston which is brought about as a result of the proposed grooves, to be distributed relatively evenly over the cross-section of the piston so that unnecessary thin patches of material or concentrations of material are avoided.

BRIEF DESCRIPTION OF THE DRAWINGS

In the accompanying drawings, non-limiting examples of the invention are described.

DETAILED DESCRIPTION OF THE DRAWINGS

Figure 1:
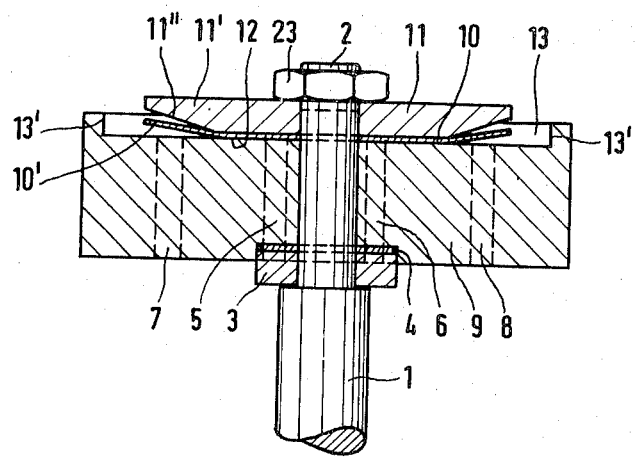
FIG. 1 is a view in cross-section through a shock absorber piston of the invention.
Figure 3:
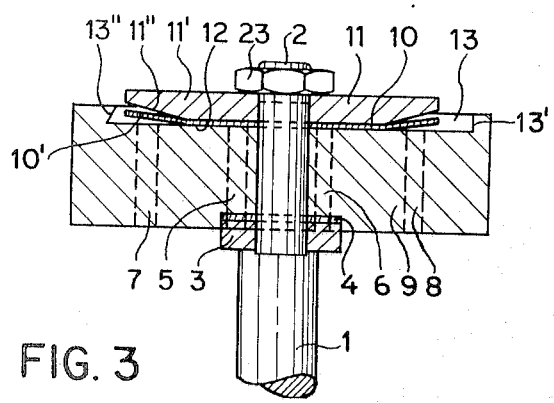
FIGS. 3 and 4 are views similar to FIG. 1 of two further embodiments.
Figure 4:
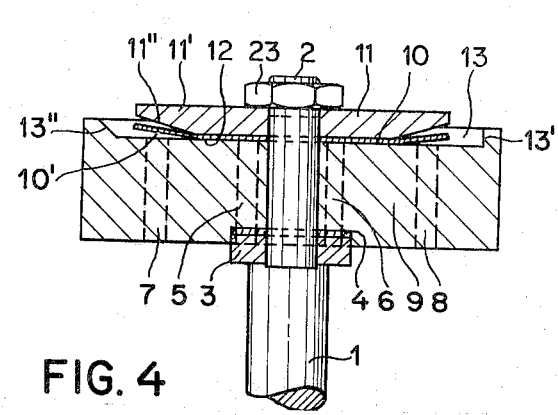

FIG. 1 shows a piston rod 1 having an end portion 2 of reduced diameter. On said end portion 2, a first support plate 3 with a first rectangular resilient valve plate 4 are arranged, with said valve plate 4 covering valve ports 5 and 6 in a body 9 of the piston on the side facing the piston rod 1. The valve ports 5 and 6 lie close to one another. Opposite these ports 5 and 6, corresponding ports are arranged which cannot however be seen because of the way the section is shown in the drawing. At right angles to this arrangement, further valve ports 7 and 8 can be seen of which two parts lie adjacent to each other, as is the case with the valve ports 5 and 6. This means that the valve ports, of which there are eight altogether, are distributed relatively evenly over the whole cross-section of the piston body 9. The valve ports 7 and 8 are covered by a second rectangular resilient valve plate 10 which is in turn pressed by a central zone of a support plate 11 flat against bottom 12 of a rectangular groove 13 in the body 9. The whole arrangement is fixed on the end portion 2 of the piston rod 1 by a piston rod nut 23. End regions 11' of the support plate 11 have a sloping surface 11'' which permits limited flexing of end portions 10' of the valve plate 10. In the drawing, the end portion 10' of the valve plate 10 is shown in a central position. In the right-hand side of the drawing a narrow end wall 13' of the groove 13 is shown extending parallel to the axis of the piston body 9, and with these measurement ratios, this leads to a damping force which increases more or less proportionally to the speed of the piston. In FIGS. 3 and 4, two alternative profiles of end wall 13'' and 13''' are shown. The profile of end wall 13'' provides a progressive damping effect, whereas the profile of the end wall 13''' provides a diminishing damping effect. The first resilient valve plate 4, the support plate 3 and the piston body 9 co-operate in a similar manner to that described above with reference to plates 10 and 11.

Figure 2:
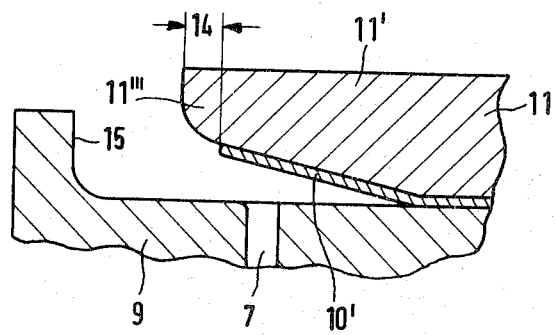
FIG. 2 is a partial cross-section through a special form of this piston.

The partial cross-section shown in FIG. 2 illustrates a special case of a nozzle-type profile of the support plate. In this embodiment, the end region 11' of the support plate 11 has the same angle of slope as the end portion 10' of the valve plate 10 which is capable of bending. An outer edge zone 11'''' of the end region 11'' has an inner surface profiled in the manner of a nozzle. Although length 14 of the edge zone 11'''' geometrically reduces the distance between the edge of the valve plate 10 and or inner edge 15 of the groove in the piston body 9, on the narrow side, an increase in the cross-section with regard to the flow is however produced, and the reasons for this have been mentioned previously. This is of considerable importance particularly when the valve plate 10 arrives at its end position when the piston speed is very high and the damping force is to be prevented from increasing too quickly.

In the illustrated embodiments, the longitudional sides of the groove 13 and of the support plate 11 are profiled to alter the cross-sectional area of flow in the regions of the end portions 10' of the valve plate 10, i.e., in those regions which have a variable angle of opening. The longitudional sides of the support plate 3 and corresponding groove are similarly profiled. The aforementioned profiles extend at least as far as the middle regions of the support plates.

As can be seen from the illustrated embodiments, the valve plates are completely received in the respective grooves and the support plates are at least partially received in the respective grooves.

I claim:

1. A piston for a shock absorber, comprising a piston body, a piston rod to which said piston body is fixedly secured, opposed valve ports in said body, resilient valve plates completely received in respective grooves in axial end faces of said body to overlie said ports, and rigid support plates at least partially received in said grooves and having central regions abutting flat against the respective valve plates and end regions adapted to limit opening movement of the respective resilient valve plates, said support plates being of at least the same length as the respective valve plates, and the grooves being greater in length than the respective support plates but less than the diameter of the axial end faces of the piston body, whereby each groove has a pair of end walls, with each end wall turning the flow of liquid through the piston body, which is initially in a generally radially outward direction, to a more nearly axial direction thus assisting the flow through the piston body and avoiding the creation of turbulence with associated losses.

2. A piston for a shock absorber, comprising a piston body, a piston rod to which said piston body is fixedly secured, opposed valve ports in said body, resilient valve plates completely received in respective grooves in said body to overlie said ports, and rigid support plates at least partially received in said grooves and having central regions abutting flat against the respective valve plates and end regions adapted to limit opening movement of the respective resilient valve plates, said support plates being of at least the same length as the respective valve plates, the grooves being greater in length than the respective support plates but less than the diameter of the piston body, and end walls of the grooves being profiled to alter the cross-sectional area of flow in the region of the respective valve plates, said valve plates having variable angles of opening.

3. The piston as claimed in claim 1 wherein ends of the support plates are profiled to alter the cross-sectional areas of flow in regions of the respective valve plates, which have variable angles of opening.

4. The piston as claimed in claim 2, wherein ends of the support plates are profiled to alter the cross-sectional area of flow in the region of the respective valve plates.

5. The piston as claimed in claim 1, wherein the support plates have edge zones which project beyond the ends of the respective valve plates and are each profiled in the manner of a nozzle.

6. The piston as claimed in claim 5, wherein the edge zones extend up to about one quarter of the distance between the ends of the respective valve plates and adjacent end walls of the grooves.

7. A piston for a shock absorber, comprising a piston body, a piston rod to which said body is fixedly secured, opposed valve ports in said body, resilient valve plates completely received in respective grooves in said body to overlie said ports, and rigid support plates at least partially received in said grooves and having central regions abutting flat against the respective valve plates and end regions adapted to limit opening movement of the respective resilient valve plates, said support plates being of at least the same length as the respective support plates but less than the diameter of the piston body, and the valve ports being arranged in two opposing pairs which are disposed angularly apart by 90° and are overlain on both sides of the piston by the respective valve and support plates.

8. A piston for a shock absorber, comprising a piston body, a piston rod to which said piston body is fixedly secured, opposed valve ports in said body, resilient valve plates completely received in respective grooves in said body to overlie said ports, and rigid support plates at least partially received in said grooves and having central regions abutting flat against the respective valve plates and end regions adopted to limit opening movement of the respective resilient valve plates, aid support plates being of at least the same length as the respective valve plates, the grooves being greater in length than the respective support plates but less than the diameter of the piston body, and side walls of the grooves being constructed with profiles for altering the cross-sectional areas of flow in regions of the respective valve plates which have variable opening angles.

9. The piston as claimed in claim 8, wherein longitudional sides of the support plates are constructed at least as far as their middle regions with profiles for altering the cross-sectional areas of flow in regions of the respective valve plates which have variable opening angles.

10. The piston as claimed in claim 1, wherein longitudional sides of the support plates are constructed at least as far as their middle regions with profiles for altering the cross-sectional areas of flow in regions of the respective valve plates which have variable opening angles.

* * * * *